May 8, 1928.　　　　　　　　　　　　　　　　　1,669,113
A. P. WOOD
STATOR CONSTRUCTION FOR DYNAMO ELECTRIC MACHINES
Filed Feb. 19, 1927

Inventor
Alexander P. Wood,
by *Alexander S. Lovell*
His Attorney.

Patented May 8, 1928.

1,669,113

UNITED STATES PATENT OFFICE.

ALEXANDER P. WOOD, OF SCHENECTADY, NEW YORK, ASSIGNOR TO GENERAL ELECTRIC COMPANY, A CORPORATION OF NEW YORK.

STATOR CONSTRUCTION FOR DYNAMO-ELECTRIC MACHINES.

Application filed February 19, 1927. Serial No. 169,611.

My invention relates to dynamo-electric machines, particularly to the stators thereof, and has for its object the simplification of the structure of the stators thereof.

In building stators for dynamo-electric machines it has been usual to provide a main frame in which toothed stator laminations were retained by clamping covers having end fingers for stiffening the stator teeth formed by the laminations. The frames of these machines have been provided with accurately machined surfaces in slots or on bars secured thereto and the stator laminations have been provided with projections or notches to conform to these surfaces against which they were stacked to align them in the stator so as to give the desired clearance to the rotor when the machine was completed. It is the purpose of my invention to minimize the number of parts of the stator by employing frame plates to clamp bars which engage the sides of the stator teeth to stiffen them so as to render the use of clamping covers unnecessary.

Figure 1:
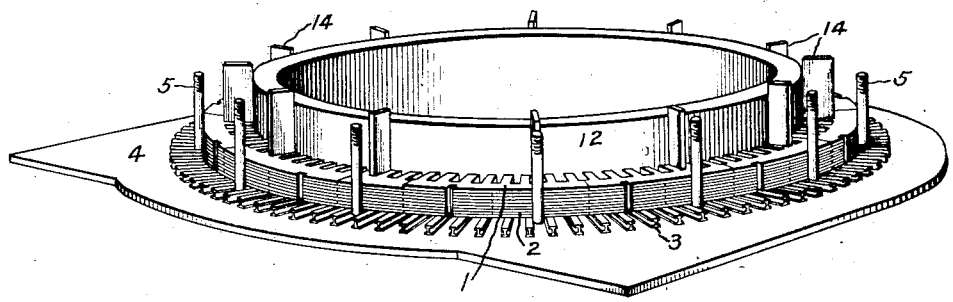
Figure 2:
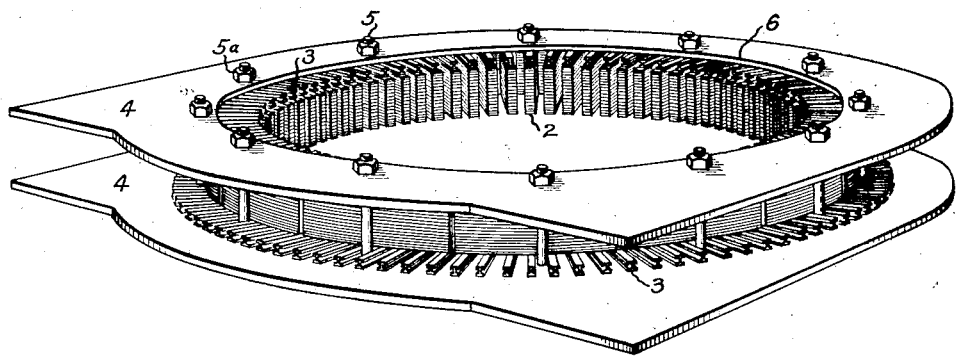
Figure 3:
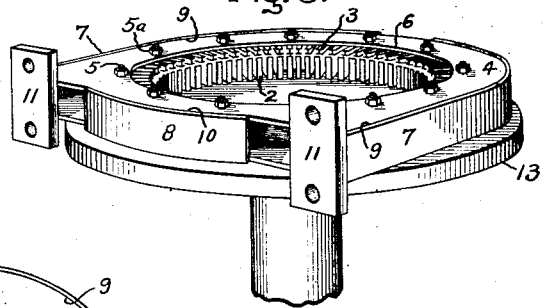
Figure 4:
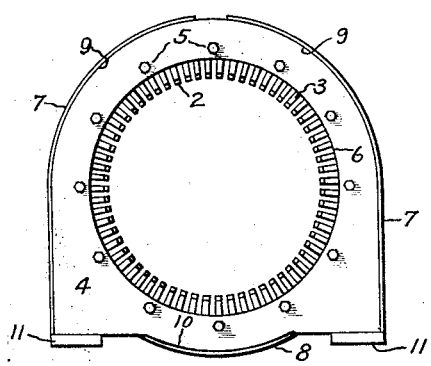

My invention will be more fully set forth in the following description taken in connection with the accompanying drawing, in which Fig. 1 is a perspective view showing part of a structure of a dynamo-electric machine including the laminations as they are arranged around a form in building the same; Fig. 2 is a perspective view of the stator as it appears after the parts thereof are clamped together and the form used in its construction has been removed therefrom; Fig. 3 is a perspective view of the complete stator, and Fig. 4 is a side elevation of the structure shown in Fig. 3.

Referring to the drawing, my improved stator includes the usual toothed lamination sectors 1 which are overlapped as shown in Fig. 1 to constitute a toothed annular body 2 having a substantially cylindrical toothed inner periphery. In accordance with my invention bars 3 are radially arranged engaging each side of the teeth of the annular body and extending substantially the entire length thereof and radially beyond the body. The annular body and the bars are clamped together between frame plates 4 by nuts 5ª on the bolts 5 extending through the plates radially beyond the laminations. The frame plates are clamped against the bars 3 with sufficient force to form a unitary structure of the plates, bars and the annular body by friction therebetween in which the bars serve as end fingers to stiffen the teeth of the annular body. The frame plates have large central openings 6 therein to give the necessary clearance for the end connections of the stator winding in the completed machine and engage the bars 3 adjacent the base of the teeth of the annular body. Since the sides only of the frame plates engage the laminations and support them by friction accurate machining of the frame plates or centering of the bolt holes therein is not required because the laminations are not centered by contact with any portion thereof. The rigidity of the stator is increased and its appearance made somewhat more finished by the use of webs 7 and 8 welded at 9 and 10 to the outer edges of plates 4. The complete stator, as shown in Fig. 3, is supported in any convenient manner in operative relation to the rotor of a dynamo-electric machine on the pedestals 11 which in this instance are welded to the plates 4.

It will be clear from the foregoing that I have simplified the construction of stators for dynamo-electric machines.

What I claim as new and desire to secure by Letters Patent of the United States, is,—

1. A stator for a dynamo-electric machine comprising sector shaped toothed laminations arranged to constitute an annular body having a substantially cylindrical toothed inner periphery, bars on each side of said annular body engaging the sides of said teeth, frame plates on each side of said body engaging said bars, and means including webs between said frame plates for clamping said plates, said bars and said annular body firmly together to constitute a unitary structure.

2. A stator for a dynamo-electric machine comprising sector shaped toothed laminations arranged to constitute an annular body having teeth forming a substantially cylindrical inner periphery, bars on each side of said annular body engaging the sides of said teeth which extend substantially the entire length of the teeth and radially beyond the annular body, frame plates on each side of said body engaging said bars adjacent the base of the teeth of said body and extending radially beyond the outer ends of the annular body and said bars, and means spaced from the outer periphery of said annular body for clamping said plates, said bars and said annular body firmly together to constitute a unitary structure.

In witness whereof, I have hereunto set my hand this 18th day of February, 1927.

ALEXANDER P. WOOD.